United States Patent

Shirakawa

[11] Patent Number: 5,926,825
[45] Date of Patent: Jul. 20, 1999

[54] ARTICLE LAYOUT DEVICE FOR AUTOMATICALLY MAKING LAYOUT OF MULTI-COLUMN DOCUMENTS

[75] Inventor: Takahisa Shirakawa, Tokyo, Japan

[73] Assignee: NEC Corporation, Tokyo, Japan

[21] Appl. No.: 08/707,031

[22] Filed: Sep. 3, 1996

Related U.S. Application Data

[30] Foreign Application Priority Data

Aug. 31, 1995 [JP] Japan ................................. 7-246697

[51] Int. Cl.$^6$ .................................................. G06F 17/21
[52] U.S. Cl. ............................................................ 707/521
[58] Field of Search ..................................... 707/517–525

[56] References Cited

U.S. PATENT DOCUMENTS

| | | | |
|---|---|---|---|
| 5,089,990 | 2/1992 | Saito ........................................ | 707/520 X |
| 5,179,650 | 1/1993 | Fukui et al. ............................ | 395/148 |
| 5,434,961 | 7/1995 | Horiuchi et al. ...................... | 707/517 X |
| 5,633,996 | 5/1997 | Hayashi et al. ....................... | 707/521 X |
| 5,701,500 | 12/1997 | Ikeo et al. ............................. | 707/517 |

FOREIGN PATENT DOCUMENTS

| | | |
|---|---|---|
| A1 3-176148 | 7/1991 | Japan . |
| A2 4-263357 | 9/1992 | Japan . |

*Primary Examiner*—Joseph H. Feild
*Attorney, Agent, or Firm*—Foley & Lardner

[57] ABSTRACT

An article layout device comprises a layout execute section which virtually sets rectangular columns on an area where documents are arranged and searches for an unused sole column or compound column until the columns are filled with articles or all articles are completely arranged to attain a layout result on articles which can be arranged; an article entry priority output section which outputs the entry priority of each article to be entered, as required; a layout result evaluation section which gives an evaluation value based on the entry priority of the article to each of a plurality of layout results determined by the layout execute section; and a best layout result retrieval section which selects the layout result having the best evaluation value given by the layout result evaluation section among the plurality of layout results determined by the layout execute section.

20 Claims, 14 Drawing Sheets

FIG. 4(A)
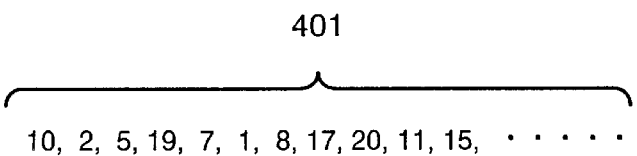
10, 2, 5, 19, 7, 1, 8, 17, 20, 11, 15, · · · · ·
FIG. 4(B)
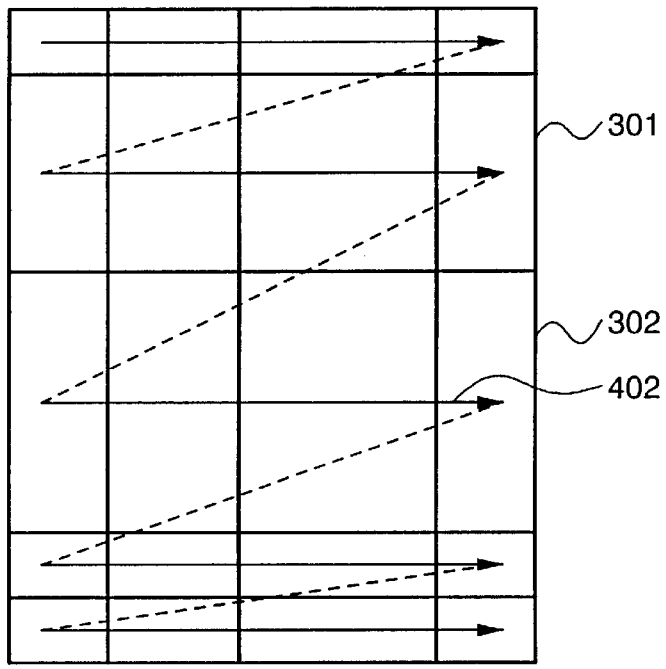
FIG. 4(C)
| 10 | 2 | 5 | 19 |
|----|----|----|----|
| 7 | 1 | 8 | 17 |
| 20 | 11 | 15 | 3 |
| 18 | 9 | 12 | 13 |
| 16 | 14 | 6 | 4 |

FIG. 7(A)
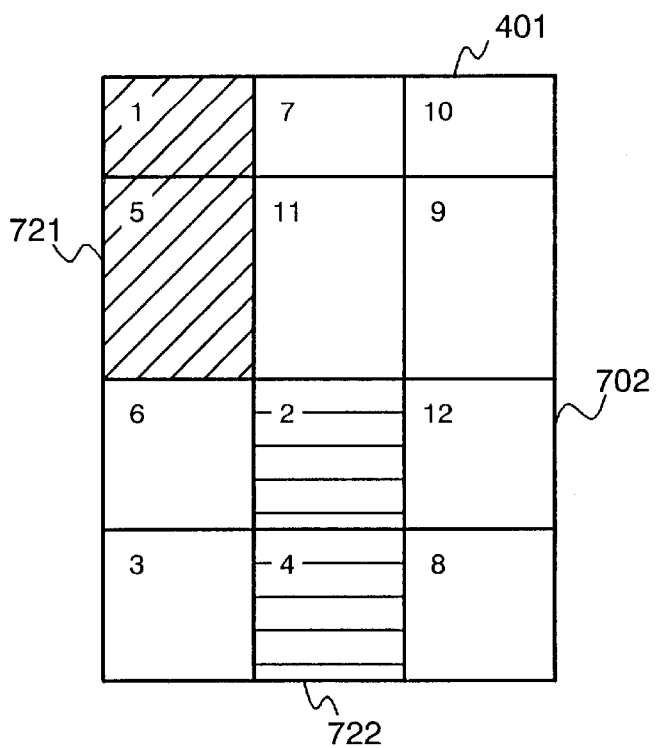
COLUMNS ON PAPER
FIG. 7(B)
COLUMN CANDIDATE GROUP
3
6
6, 3
7
7,10
7,10, 9
7,10, 9,11
7,10, 9,11,12
7,10, 9,11,12, 8
8
9
9,12
9,12, 8
10
10, 9
10, 9,12
10, 9,12, 8
11
11, 9
11, 9,12
11, 9,12, 8
12
12, 8
FIG. 7(C)
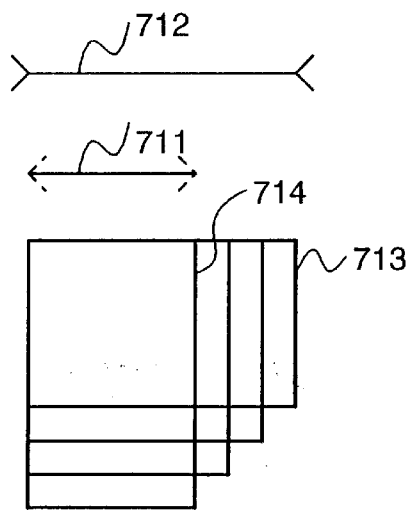
ARTICLE FORM RESTRICTION INFORMATION

FIG. 8

| ARTICLE PROCESSING ORDER | ARTICLE NO. |
|---|---|
| 1 | 3 |
| 2 | 9 |
| 3 | 5 |
| 4 | 1 |
| 5 | 8 |
| 6 | 4 |
| 7 | 7 |
| 8 | 2 |
| 9 | 6 |

COLUMNS ON PAPER

FIG. 11

| ARTICLE NO. | ARTICLE ENTRY PRIORITY |
|---|---|
| 1 | 10 |
| 2 | 20 |
| 3 | 5 |
| 4 | 2 |
| 5 | 16 |
| 6 | 11 |
| 7 | 15 |
| 8 | 17 |
| 9 | 8 |

ARTICLE LAYOUT DEVICE FOR AUTOMATICALLY MAKING LAYOUT OF MULTI-COLUMN DOCUMENTS

BACKGROUNDS OF THE INVENTION

1. Field of the Invention

The invention relates to an article layout device for making a layout of documents arranged into columns, which is used for a word processor, DTP, newspaper or magazine editing system and others.

2. Description of the Related Art

Several devices have been proposed as a device for assisting the work for making a layout on paper of articles which have been prepared and arranged into columns by a word processor or DTP.

Examples of such devices include a technology disclosed in Japanese Patent Laid-open Publication (Kokai) No. Heisei 3-176148 entitled "Document Layout Editing Device". This publication proposes a device (hereinafter referred to as first prior art) for making a layout of multiple-column articles by showing a temporary border with a size (area) required for arranging the articles on the layout area of a display based on the volume of articles to be laid out, character size, line space and other forms, and when a user has designated the form and position of the temporary border and commanded to make layout processing, by changing the form and/or position without changing the size of the temporary border so as not to overlap an area corresponding to the temporary border and another area in which another article has been arranged, or changes the form and/or position of the existing areas, so that a beginner who does not know composing rules can prepare multiple-column articles (documents) by relatively simple operation. For example, when an area #0 has been already arranged and the next article is to be arranged as shown in FIG. 12 (A), a temporary border 26 having a size required for arranging that article is displayed as shown in FIG. 12 (B) to make the user visually know the size of the article. And, when the user commands to make the layout processing, the shape and position of the temporary border 26 are changed and allocated as an area #1 as shown in FIG. 12(C) without changing the size of the temporary border 26 so as not to overlap the area of the temporary border 26 and the existing area #0.

Another prior art of this type is a technology disclosed in Japanese Patent Laid-open Publication No. Hei 4-263357 entitled "Information Processing Device". This publication proposes a device (hereinafter referred to as second prior art) which determines an area border for each article (sentences, figures, etc.) and another area border to be in the relationship of master and slave with respect to the change in size of the former area border before preparing a document. When the sentences in the main area border are not properly arranged after entering the sentences and others into each area border, and changes the size of the main area border and also changes the size of the slave border. For example, when sentences, figures and others are entered into each area border after previously setting area borders as shown in FIG. 13(A) and determining area borders #2 and #3 to be in the relationship of master and slave, if the allocation rate (proportion of sentences and others in the area) of the main area border #2 is for example about 60%, the main area border #2 is decreased to have an appropriate allocation rate as shown in FIG. 13(B), and the slave area border #3 is increased in a range that its allocation rate has an appropriate value.

Besides, another prior art of this type is a technology disclosed in Japanese Patent Laid-open Publication (Kokai) No. Heisei 4-70956 entitled "Document Processing Device". This publication proposes a device (hereinafter referred to as third prior art) which previously determines borders in which documents are arranged by the mouse or the like and enters character strings into each border with the keyboard or the like. If the final character of the entered character strings does not match with the line end within the border, adjusts the character size, character spacing or the like to position the last character at the line end. For example, when the entry is made as shown in FIG. 14(A), the character size is changed to position the final character at the line end within the border as shown in FIG. 14(B) or the character spacing is changed as shown in FIG. 14(C).

As described above, several devices have been proposed to assist the work of making a layout of articles, and all of them basically need the user to determine the layout of an area in which articles are arranged. Specifically, the third prior art needs the user to previously prepare the area in which documents are arranged by operating the mouse or the like. And, the first prior art automatically determines the temporary border having the required size, but needs to interactively process with the user to change the form or position of the border. Besides, the second prior art automatically changes the size between the areas in the relationship of master and slave only and needs the user to change the size of other area and to make the initial arrangement of an area in advance.

And, when a space size or the number of sheets on which articles are placed is limited, all the articles are not always placed. In such a case, it is general that the user determines which articles shall be placed to restrict the articles. This work is one of the causes which prevent the automation of layout.

SUMMARY OF THE INVENTION

A first object of the invention is to provide an article layout device which can automatically search for an area in which articles can be arranged and can make a layout of multiple-column documents containing a plurality of articles without requiring manpower.

A second object of the invention in addition to the first object is to provide an article layout device which automatically prepares a compound column which can be of a complicated form, and allows to attempt a complex engagement of an article and another article to provide an effective use of space.

A third object of the invention is to provide an article layout device which performs arrangement processing based on information on arrangement conditions of columns and articles, and evaluates the layout results to attain a layout for enabling to place more articles with higher importance within a limited layout range.

A fourth object of the invention in addition to the third object is to provide an article layout device which can prevent a situation that many articles with less form limitation having similar entry priority are not laced because of articles which have a high form limitation such as occupying a large area and high entry priority.

A fifth object of the invention is to provide an article layout device which uses a column processing order to restrict a group of candidate compound columns and limits the number of compound columns which are in a range of search to enable the reduction of a processing volume.

A sixth object of the invention is to provide an article layout device which automatically generates a group of a plural pieces of information including three pieces of information on a column configuration, article processing order and column processing order used to arrange articles.

A seventh object of the invention is to provide an article layout device which takes an empty area into consideration in addition to the article entry priority to evaluate the layout results, allows a layout by comprehensively judging the article entry priority and the empty area, and enters more articles with high importance within a limited range of layout area, thereby attaining a layout with a less empty area.

According to one aspect of the invention, an article layout device for automatically making a layout of multi-column documents comprising:

layout means for virtually setting rectangular columns on an area where documents are arranged, and searching for an unused sole column or compound column until said columns are filled with articles or all articles are completely arranged to attain layout results on articles which can be arranged;

article entry priority output means for outputting the entry priority of each article to be entered, as required;

layout result evaluation means for giving an evaluation value based on the entry priority of said article to each of said multiple layout results determined by said layout means; and best layout result retrieval means for selecting a layout result having the best evaluation value given by said layout result evaluation means from said multiple layout results determined by said layout means.

In the preferred construction, the article layout device further comprises article form restriction information output means for outputting form restriction information on each article to be entered to said layout means, wherein the layout means search each of groups of a plural pieces of information which contain two pieces of information on the structure of said columns and the processing order of articles to be entered and which have at least one piece of information different from other groups for an unused sole column or compound column which is appropriate for the layout of each article and meets the form restriction information on each article in the order from the first article in the processing order until all columns are filled with articles or the last article in the processing order is completely processed, and actually enter said article into said searched sole column or compound column, and if possible to enter, judge that said article can be arranged in said column, and obtain the layout result on said article which can be arranged.

In another preferred construction, the layout means search each of groups of a plural pieces of information which contain two pieces of information on the structure of said columns and the processing order of articles to be entered and which have at least one piece of information different from other groups for an unused sole column or compound column which is appropriate for the layout of each article in the order from the first article in the processing order until all columns are filled with articles or the last article in the processing order is completely processed to attain the layout result on an article which can be arranged, and in searching for the unused sole column or compound column which is appropriate for the layout of articles, search a column candidate group which contains an unused sole column group and a compound column group determined by adding unused columns one by one according to a column processing order which is separately entered from all unused columns continuing to either of two character string directions with each of every unused column as the starting point.

In the above-mentioned construction, the article layout device further comprises article form restriction information output means for outputting form restriction information on each article to be entered to said layout means, wherein the layout means search each of groups of a plural pieces of information which contain three pieces of information on the structure of said columns, the processing order of articles to be entered and the column processing order and which have at least one piece of information different from other groups for an unused sole column or a compound column which is appropriate for the layout of each article in the order from the first article in the processing order until all columns are filled with articles or the last article in the processing order is completely processed, and actually enter said article into said searched sole column or compound column, and if possible to enter, judge that said article can be arranged in said column, and obtain the layout result on said article which can be arranged.

In the above-mentioned construction, the article layout device further comprises column split information generating means for forming a structure of rectangular column to be virtually set on an area for arranging documents;

column processing order generating means for producing a column processing order;

article processing order generating means for producing a processing order of articles to be entered;

group generating means for producing groups of a plural pieces of information which contain three pieces of information on the structure of columns, the processing order of columns and the article processing order produced by said column split information generating means, column processing order generating means and article processing order generating means and which have at least one piece of information different from other groups, and for instructing the layout processing of each group to said layout means; and article form restriction information output means for outputting form restriction information on respective articles to be entered to said layout means;

wherein said layout means comprising:

column production means for attaining from said group generating means groups of a plural pieces of information which contain three pieces of information on the structure of said columns, the processing order of articles to be entered and the column processing order and which have at least one piece of information different from other groups to produce a column which meets the structure of a column in said group of information;

column candidate group generating means for producing a column candidate group which contains a group of unused sole columns among the columns produced by said column generating means and a group of compound columns determined by adding unused columns one by one according to a column processing order in said group of information among all unused columns continuing to either of two character string directions with each of every unused column as the starting point among said generated columns;

allocation judging means for receiving a notice on articles to be processed and column candidates and judging whether said articles can be arranged on said column candidates with reference to said article form restriction information; and article layout processing means for searching for column candidates in said column candidate groups appropriate to the layout of respective articles by noticing with the column candidates in the order from the first article in the processing order to said allocation judging means until all columns produced by said column generating means are filled with articles or the last article in the processing order is completely processed to attain the layout result of articles which could be arranged.

In this case, the layout result evaluation means calculate a ratio of the empty areas on the layout area with respect to the whole layout area in view of the layout result to be evaluated, and if said ratio exceeds a threshold value, decrease the evaluation value by a given value. Also, the layout result evaluation means calculate a ratio of the empty areas on the layout area with respect to the whole layout area in view of the layout result to be evaluated, and decrease the evaluation value by a value corresponding to said ratio.

According to another aspect of the invention, an article layout device for automatically making a layout of multi-column documents comprising:

column split information generating means for forming a structure of rectangular columns to be virtually set on an area for arranging documents;

column processing order generating means for producing a column processing order;

article processing order generating means for producing a processing order of articles to be entered;

group generating means for producing groups of a plural pieces of information which contain three pieces of information on the structure of columns, the processing order of columns and the article processing order produced by said column split information generating means, column processing order generating means and article processing order generating means and which have at least one piece of information different from other groups, and for instructing the layout processing of each group to said layout means;

layout means for searching each of groups of a plural pieces of information which contain three pieces of information on the structure of said columns, the processing order of articles to be entered and the column processing order obtained from said group generating means and which have at least one piece of information different from other groups for an unused sole column or compound column which is appropriate for the layout of each article in the order from the first article in the processing order until all columns are filled with articles or the last article in the processing order is completely processed to attain the layout result on an article which can be arranged;

article entry priority output means for outputting the entry priority of each article to be entered, as required;

layout result evaluation means for giving the evaluation value based on the entry priority of the article to each of a plurality of layout results determined by said layout means; and best layout result retrieval means for selecting a layout result having the best evaluation value given by said layout result evaluation means among the plurality of layout results determined by said layout means.

In the preferred construction, the article layout device further comprises article form restriction information output means for outputting form restriction information on respective articles to be entered to said layout means;

wherein said layout means comprising:

column production means which attain groups of a plural pieces of information which contain three pieces of information on the structure of said columns, the processing order of articles to be entered and the column processing order and which have at least one piece of information different from other groups to produce a column which meets the structure of a column in said group of information;

column candidate group generating means for producing a column candidate group which contains a group of unused sole columns among the columns produced by said column generating means and a group of compound columns determined by adding unused columns one by one according to a column processing order in said group of information among all unused columns continuing to either of two character string directions with each of every unused column as the starting point among said generated columns;

allocation judging means for receiving a notice on articles to be processed and column candidates and judge whether said articles can be arranged on said column candidates with reference to said article form restriction information; and article layout processing means for searching for column candidates in said column candidate groups appropriate to the layout of respective articles by noticing with the column candidates in the order from the first article in the processing order to said allocation judging means until all columns produced by said column generating means are filled with articles or the last article in the processing order is completely processed to attain the layout result of articles which could be arranged.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 4(A) is a view showing a process of allocating a column processing order to each column, indicating an example of the column processing order.

FIG. 4(B) is a diagram showing an allocating process in the column processing order to each column, indicating an allocating order of the column processing order of FIG. 4(A) to each column.

FIG. 4(C) is a diagram showing an allocating process in the column processing order to each column, indicating a state that the column processing order has been allocated to each column.

FIG. 7(A) is a diagram showing a specific processing example by article layout processing, indicating a state that articles are arranged in partway into columns.

FIG. 7(B) is a diagram showing a specific processing example by article layout processing, indicating a column candidate which has been determined in order to arrange the next article in the state shown in FIG. 7(A).

FIG. 7(C) is a diagram showing a specific processing example by article layout processing, indicating an example of article form limiting information.

FIG. 8 is a diagram showing an example of the article processing order used in the embodiment.

FIG. 11 is a diagram showing an example of the article entry priority used in the embodiment.

FIG. 14(A) is an explanatory view of the third prior art, indicating a state that a character string has been entered.

FIG. 14(B) is an explanatory view of the third prior art, indicating a state that a character size has been adjusted.

FIG. 14(C) is an explanatory view of the third prior art, indicating a state that a character spacing has been adjusted.

DESCRIPTION OF THE PREFERRED EMBODIMENT

Figure 1:
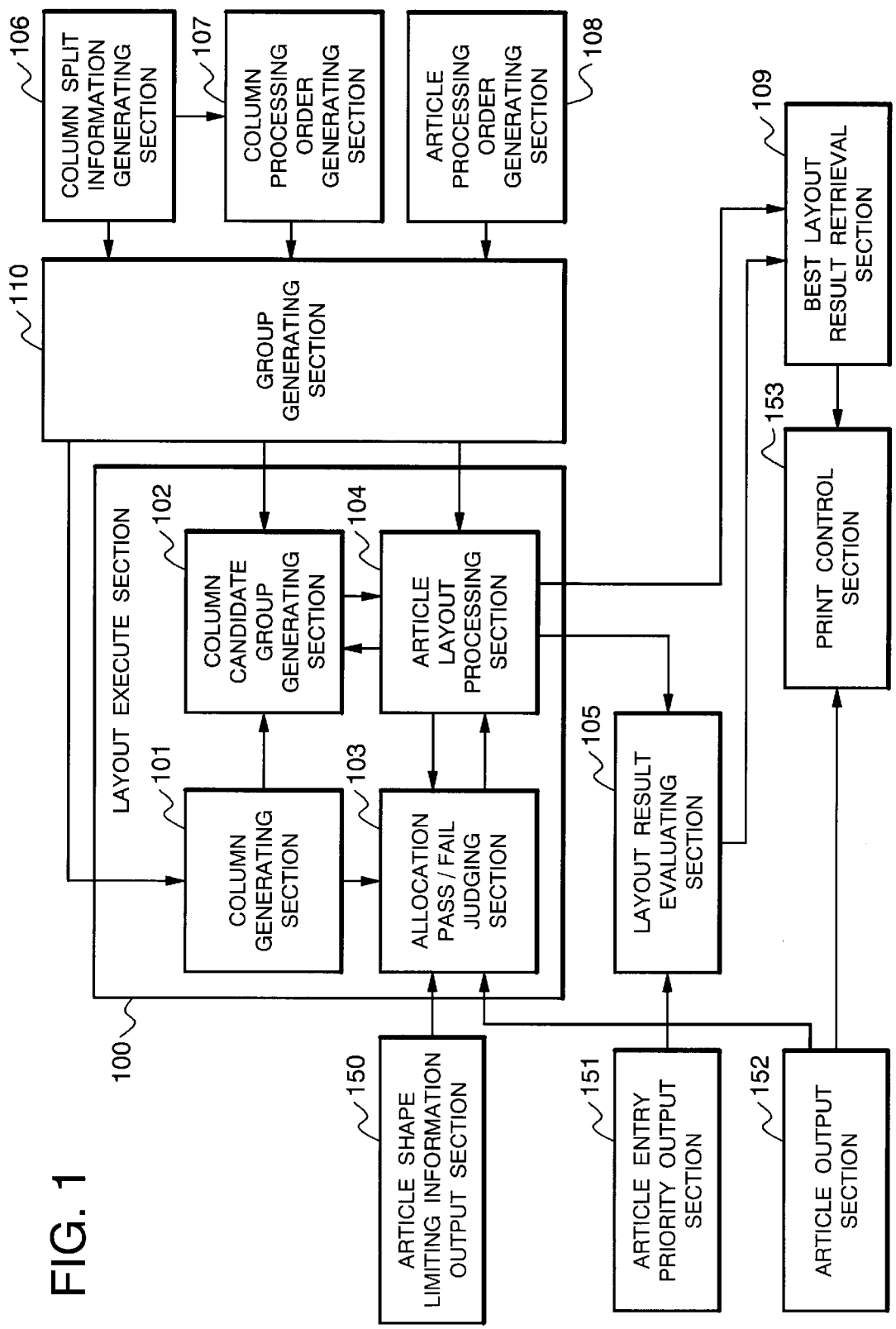
FIG. 1 is a block diagram showing a configuration of the article layout device according to one embodiment of the invention.

A preferred embodiment of the invention will be described in detail with reference to the attached drawings. FIG. 1 is a block diagram showing a configuration of the article layout device according to one embodiment of the invention.

As shown in FIG. 1, the article layout device of this embodiment comprises a layout execute section 100, a layout result evaluating section 105, a column split information generating section 106, a column processing order generating section 107, an article processing order generating section 108, a best layout result retrieval section 109, a group generating section 110, an article shape limiting information output section 150, an article entry priority output section 151, an article output section 152, and a print control section 153.

Figure 2:
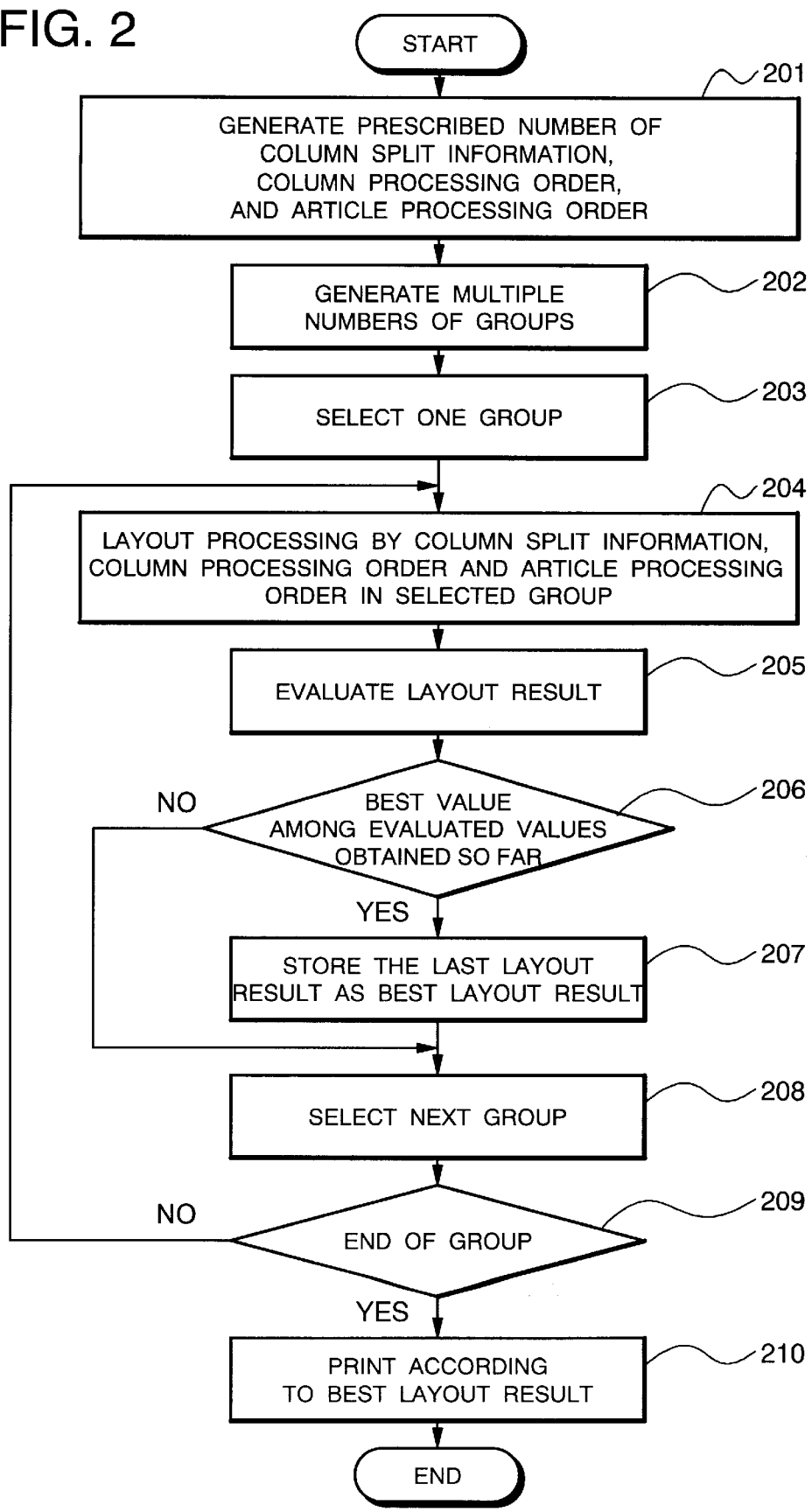
FIG. 2 is a flowchart showing a process according to this embodiment.

FIG. 2 is a flowchart showing an overview of the process of the embodiment of FIG. 1.

In this embodiment, the prescribed number of column split information, column processing order, and article processing order are generated in the column split information generating section 106, the column processing order generating section 107 and the article processing order generating section 108 respectively, and sent to the group generating section 110 (step 201). The group generating section 110 includes all of three pieces of information on column split information, column processing order and article processing order, and generates a group of a plural pieces of information in which at least one piece of information is different from another group (step 202). Then, the group generating section 110 selects one group from the generated group of a plurality of information and sends the column split information, column processing order and article processing order to the layout execute section 100 (step 203).

The layout execute section 100 executes the layout process to place an article to be entered onto the layout area under the conditions indicated by each piece of information (step 204). And, the layout result evaluating section 105 evaluates the layout results obtained upon processing by the layout execute section 100 (step 205), and the best layout result retrieval section 109 judges whether the evaluated value by the layout result evaluating section 105 is the best value among the evaluated values obtained so far (step 206). If the applicable evaluated value is the best value among the evaluated values obtained so far, the applicable layout result is stored as the best layout result together with the evaluated value (step 207). On the other hand, if the obtained evaluated value is a value inferior than the best value obtained so far (NO in step 206), the applicable evaluated result is not stored. In the case of the layout result based on a group of the first information, there is no existence of prior evaluated result, so that it is judged to be YES in step 206, and the layout result and the evaluated value are stored in the best layout result retrieval section 109.

When the processing based on one group is completed, the group generating section 110 selects the next group (step 208), and follows the above process on the newly selected group. After completing the process on all groups (YES in step 209), the best layout result retrieval section 109 stores the best layout result among the layout results on all groups. Then, the print control section 153 prints on paper according to the best layout result obtained (step 210).

What has been described above is the outline of the operation in this embodiment. The functions and operations of the respective components configuring the layout device will be described in detail below.

Column Split Information Generating Section 106

The column split information generating section 106 comprises a program-controlled CPU and a memory, generates the prescribed number of column split information specifying the structure of columns virtually determined in an area (hereinafter referred to as layout area) in which documents are arranged, and outputs to the group generating section 110 and the column processing order generating section 107. The column split information specifies the number, form, size (area), and others of a rectangular column. Specifically, for example, the number of column can be expressed by the vertical split number and horizontal split number of the layout area, and the column form and size can be expressed by a ratio of increase or decrease with respect to a length obtained by equally dividing the layout area.

Figure 3:
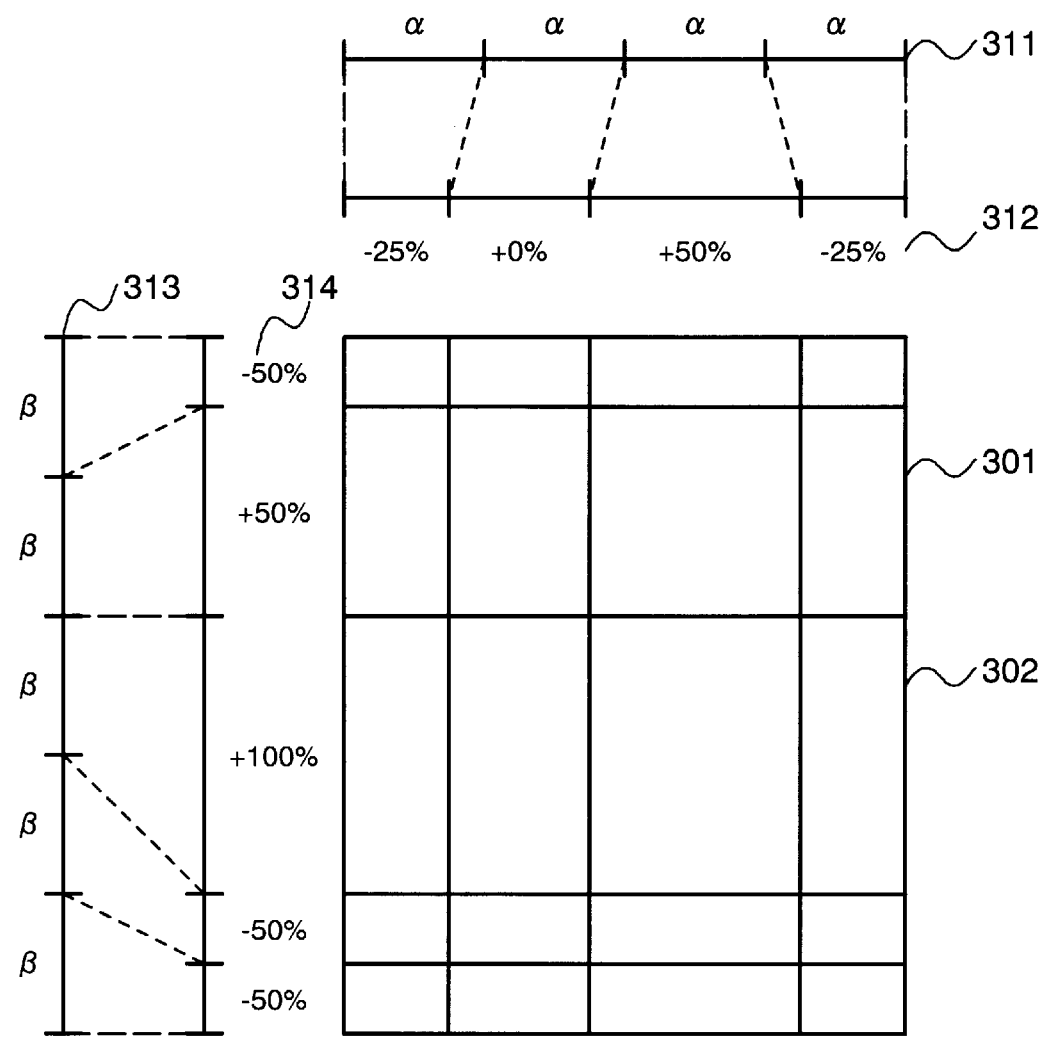
FIG. 3 is a diagram illustrating the contents of column generating process.

Reference numerals 311 to 314 in FIG. 3 visually show examples of the column split information. In FIG. 3, 311 shows the vertical split number of a column, which is "4" in this case. Reference numeral 312 shows the horizontal length of each column, expressing in the ratio of increase or decrease with respect to a length when the layout area is vertically divided equally by the split number 311. In this case, respective columns are 125%, 0%, +50% and −25% from left to right. It indicates that when each length obtained by dividing the horizontal length of the layout area into quarters is "α" as illustrated, the horizontal length of the leftmost column is "0.75 α", the horizontal length of the second column from left is "α", the horizontal length of the third column from left is "1.5 α", and the horizontal length of the rightmost column is "0.75 α". Reference numeral 313 shows the horizontal split number of a column, which is "5" in this case. Reference numeral 314 shows the vertical length of each column, expressing in the ratio of increase or decrease with respect to a length when the layout area is horizontally divided by the split number 313. In this case, respective columns are −50%, +50%, +100%, −50%, and −50%. It indicates that when each length obtained by dividing equally the vertical length of the layout area into five parts is "β" as illustrated, the vertical length of the top end column is "0.5 β", the vertical length of the second column from the top is "1.5 β", the vertical length of the third column from the top is "2 β", the vertical length of the fourth column from the top is "0.5 β", and the vertical length of the bottom column is "0.5 β". The ratio of increase or decrease with respect to the equal division of the column length in each direction is adjusted so that the total value of all columns is 0%.

The split number and the length of each column can be determined according to random numbers having an average value as the core by using a random number generator having normal distribution with a mode 0%. In this case, absolute value of the ratio of increase or decrease with respect to the equally divided length of the layout area indicating the column length looks better by controlling the random number generator so as to decrease the horizontal direction when writing from left to right or the vertical direction when writing from top to bottom.

Column Processing Order Generating Section 107

The column processing order generating section 107 comprises a program-controlled CPU and a memory, generates prescribed number of processing order of all columns existing on the layout area, and outputs to the group generating section 110. The column processing order is produced by replacing the order of natural numbers up to the number of columns existing on the layout area by the random number generator. For example, as shown in FIG. 3, when the column split number produced by the column split information generating section 106 includes 4 vertically and 5 horizontally, there is 20 (=4×5) columns, so that natural numbers 1 to 20 are replaced at random to produce a single column processing order, and the order is further changed to produce another single column processing order.

Article Processing Order Generating Section 108

The article processing order generating section 108 comprises a program-controlled CPU and a memory, generates the prescribed number of processing order of all articles to be put on the layout area, and outputs to the group generating section 110. The article processing order is produced by replacing the order of article numbers assigned to the respective articles to be entered by the random number generator. For example, when there are nine articles having article Nos. 1 to 9 as the articles to be entered, the order of these article Nos. is replaced at random to produce a single article processing order, and the order is further changed to produce another single article processing order.

In the above descriptions on the column split information generating section 106, the column processing order generating section 107 and the article processing order generating section 108, the column split information, the article processing order and the column processing order have been determined to be produced in complete random numbers, but prescribed numeric array may be used, or random numbers and prescribed numeric array may be used to produce them. For example, the column split information can be produced by determining the size of a column at a certain position to be a specified value and determining the remaining by random numbers, the article processing order and the column processing order can be produced by determining the article Nos. as the processing order or using a prescribed numeric array for the first half and adding random numbers thereto. According to such a configuration, a specific article can be forcedly allocated to a column with a specific size at a specific position. Thus, specific areas for paper name, header, footer and others can always be arranged at the same position and in the same size.

Group Generating Section 110

The group generating section 110 comprises a program-controlled CPU and a memory, and produces a group of information containing the column split information, the column processing order and the article processing order. Specifically, the prescribed number of column split information produced by the column split information generating section 106, the prescribed number of column processing order produced by the column processing order generating section 107 with respect to each column split information, and the prescribed number of article processing order produced by the article processing order generating section 108 are entered. And, a plurality of groups which include all 3 pieces of information on the column split information, the column processing order and the article processing order and have at least one piece of information differing from other groups are produced. Combination of the plurality of groups can be made by combining a different article processing order with the same column split information and column processing order, combining a different column processing order and a different article processing order with the same column split information, or combining different column split information, column processing order and article processing order.

For example, when column split information A1, A2, A3, three column processing orders B1, B2, B3 corresponding to the column split information A1, A2, A3, and three article processing orders C1, C2, C3 are produced, there are 27 ways of combination, and according to the number of determined groups, three groups of e.g., "A1, B1, C1", "A2, B2, C2", and "A3, B3, C3" are produced. Naturally, combinations "A1, B1, C1", "A1, B1, C2", "A1, B1, C3", "A2, B2, C1", "A2, B2, C2", "A2, B2, C3", "A3, B3, C1", "A3, B3, C2", and "A3, B3, C3" may be produced, and the number of groups is arbitrary as far as it is plural. Actually, the processing performance or the like of the article layout device is taken into consideration to make the setting. After producing the plurality of groups, the group generating section 110 outputs the groups one by one to the layout execute section 100. A single group containing the column split information, the column processing order and the article processing order to be outputted to the layout execute section 100 will be referred to as "A, B, C" below.

Layout Execute Section 100

The layout execute section 100 comprises a program-controlled CPU and a memory, and repeatedly executes the layout processing of articles into the layout area until all columns defined by the column split information A in the inputted group "A, B, C" are filled with articles, or the last article in the article processing order C is completely processed. Specifically, in the order from the first article in the processing order, an unused single column or compound column adaptive to the layout of that article is searched to determine the layout result of the article which can be arranged. And, the obtained layout result is outputted to the layout result evaluating section 105 and the best layout result retrieval section 109.

The compound column is a group of columns produced by directing attention to a prescribed unused column, and adding the unused columns one by one in order according to the column processing order B from the unused columns continuous in a prescribed direction starting from the above column as the starting point. The continuous direction for extracting the unused columns continuing from the column as the starting point (hereinafter referred to as the start column) includes two directions, one with the character string running and the other with lines running in the document to be entered (these directions will be referred to as the character string direction below). For example, when the document is written in English, these two directions include one direction from left to right that words are in a row and the other direction from top to bottom that the lines are arranged.

The layout execute section 100 in this embodiment comprises, to achieve the above-described functions, a column generating section 101, a column candidate group generating section 102, an allocation pass/fail judging section 103, and the article layout processing section 104 as shown in FIG. 1. Functions and operations of the components will be described below.

Column Generating Section 101

The column generating section 101 generates a column which agrees with the column split information A in the group "A, B, C", and outputs the generated column information to the column candidate group generating section 102 and the allocation pass/fail judging section 103. For example, when the column split information described with reference to reference numerals 311 to 314 in FIG. 3 is given, the column generating section 101 determines a horizontal length $\alpha$ equally divided by dividing the horizontal size of a layout area 301 on a previously designated space by a partition number 311, and a vertical length $\beta$ equally divided by dividing the vertical size of the layout area 301 by a partition number 313. And, ratios 312, 314 of increase or decrease with respect to these equal divisions are multiplied to determine 0.75 $\alpha$, $\alpha$, 1.5 $\alpha$ and 0.75 $\alpha$ from left to right as the horizontal length of each column 302, and 0.5 $\beta$, 1.5 $\beta$, 2 $\beta$, 0.5 $\beta$ and 0.5 $\beta$ from top to bottom as the vertical length. And, the partition numbers in the vertical and horizontal directions of the layout area 301 and the length of each column 302 are outputted as the column information to the column candidate group generating section 102 and the allocation pass/fail Judging section 103.

Column Candidate Group Generating Section 102

Based on the partition number of the layout area 301 in the column information entered from the column generating section 101, the column processing order B in the group "A, B, C" given from the group generating section 110, and the unused column information (information indicating a column not associated with an article) entered from the article layout processing section 104, the column candidate group generating section 102 produces a column candidate group for every unused column among the columns produced by the column generating section 101. The column candidate group is a column group comprising a sole unused column and a compound column group which is produced by directing attention to a prescribed unused column, extracting all unused columns continuing to either of two directions which are character string direction with the above column as the starting column, and adding the unused columns one by one in accordance with the column processing order B. A method of generating the column candidate group will be described below with reference to FIG. 4.

When the vertical and horizontal partition numbers entered from the column generating section 101 are "4" and "5" respectively, the layout area 301 where articles are arranged has 20 columns 302 as shown in FIG. 4(C). The column candidate group generating section 102 allocates the column processing order B in the order indicated by an arrow 402 in FIG. 4(B) to these columns 302. Therefore, when the column processing order B is defined as shown by reference numeral 401 in FIG. 4(A), each column 302 is allocated with a column processing order 403 as shown in FIG. 4(C). The column candidate group generating section 102, after allocating a column processing order, considers the unused column information noticed from the article layout processing section 104 to produce a column candidate group. For convenience of description, considering the initial state that all columns 302 are not used, the production of the column candidate group is conducted as follows.

First, columns continuing with a column (hereinafter, it will also be referred to as the column 1) which is the first to be processed as the start column are selected. Column 2, column 8, column 11 and column 7 are around the column 1. At this time, when two directions in the character string direction are determined to be rightward and downward directions in the same way as English, the column 2 and the column 7 are excluded from the candidates. When the remaining column 8 and column 11 are compared, the column 8 is selected because its column processing order is smaller than that of the column 11. Specifically, as to the start column 1, a compound column consisting of the column 1 and the column 8 is produced first. Then, columns which continue in rightward and downward directions from this compound column include column 17, column 15 and column 11, and the column 11 has the lowest column processing order, so that a compound column consisting of the column 1, column 8, and the column 11 is produced. When all compound columns on columns which are the first in the column processing order are determined, the column-candidate group generating section 102 adds the column 1 which is the start column to the compound column to be a part of the column candidate group. Then, all column candidate groups are determined in the same way for the second and following columns in the column processing order. And, the column candidate groups thus produced are outputted to the article layout processing section 104. The sole column and the compound column in the outputted column candidate groups are used as the unit for examining whether a certain article can be arranged or not.

Allocation Pass/Fail Judging Section 103

The allocation pass/fail judging section 103 receives a notice of a column candidate and an article to be subject to the judgment of allocation pass or fail from the article layout processing section 104, judges whether this article can be put on this column candidate, and returns the judged result to the article layout processing section 104. There are several methods to judge whether a certain article can be arranged on a column candidate with a given form and size. For example, in view of the character volume, character size, character spacing, line spacing and others contained in the article, a size of the area required to arrange this article is estimated, and judgment can be made according to whether the column candidate meets the estimation. And, judgment can also be made by actually placing this article on the column candidate. In this embodiment, the latter method is basically used, but the column candidate is previously checked whether it meets the form restriction of the article, and the article is actually placed on only the column candidate which meets the form restriction to judge the pass or fail of the arrangement. Therefore, the article form limiting information output section 150 which outputs the article form restriction information determined for each article to be entered is connected to the allocation pass/fail judging section 103.

The article form limiting information output section 150 comprises a program-controlled CPU and a memory, reads required article form restriction information from a given database in response to the request by the allocation pass/fail judging section 103, and outputs to the allocation pass/fail judging section 103. The article form restriction information is information specifying the form of an area in which the article can be arranged, including maximum and minimum values of vertical and horizontal lengths concerning the area. And, the article form limiting information output section 150 also outputs for each article other article form restriction information such as maximum and minimum values of font, maximum and minimum values of character spacing and line spacing, and maximum and minimum values of a ratio between character spacing and line spacing which are required to actually enter the article. The contents of the article are obtained from the article output section 152.

Figure 5:
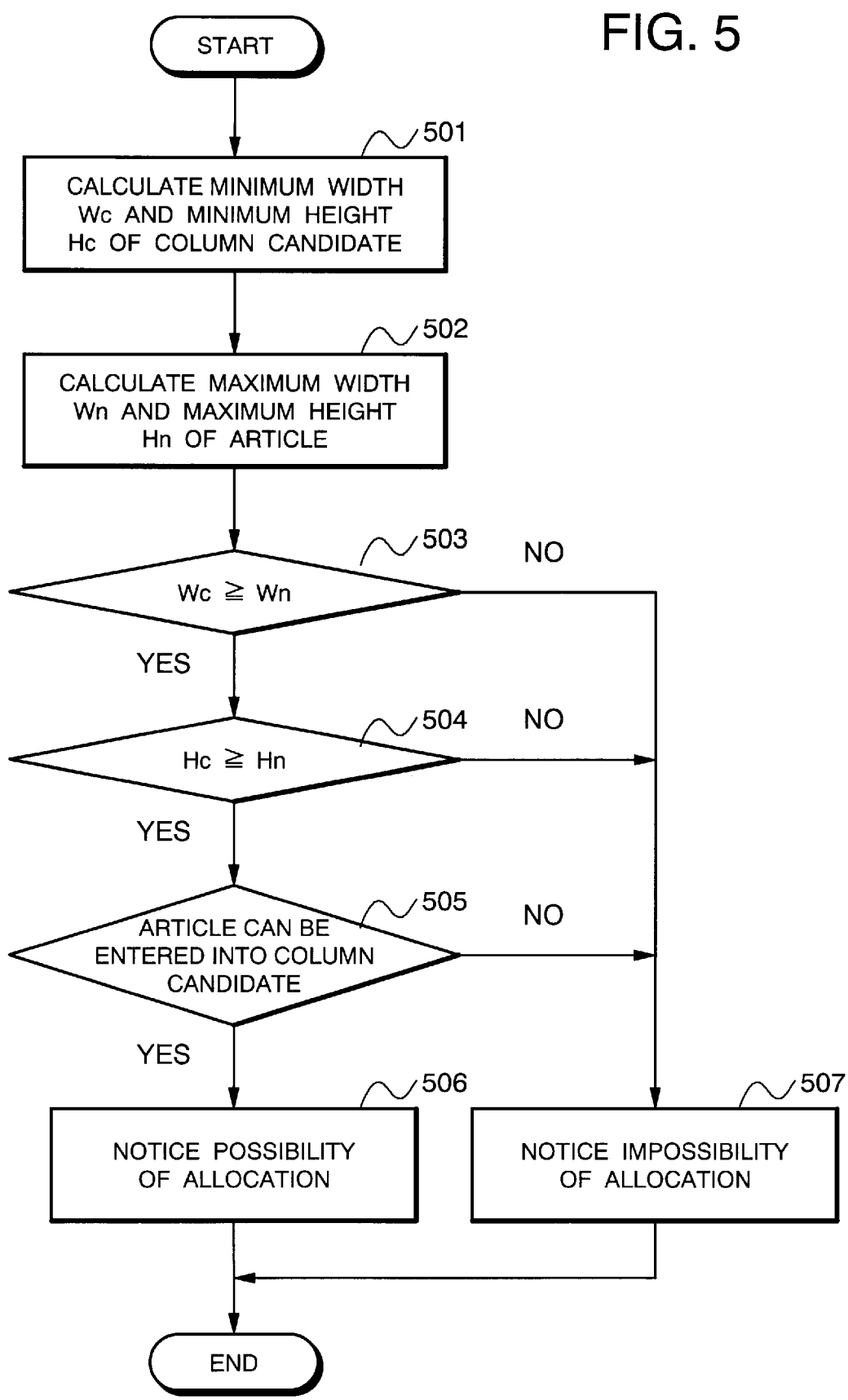
FIG. 5 is a flowchart showing a process by an allocation pass/fail judging section.

FIG. 5 is a flowchart showing the process performed by the allocation pass/fail judging section 103. Upon receiving the notice of a column candidate and an article to be subject to the judgment of allocation pass or fail from the article layout processing section 104, the allocation pass/fail judging section 103 calculates a minimum width Wc and a minimum height Hc of the noticed column candidate according to the column information outputted from the column generating section 101 (step 501). Then, the allocation pass/fail judging section 103 sends the article number of the article noticed by the article layout processing section 104 to the article form limiting information output section 150, and obtains a maximum width Wn and a maximum height Hn of the article (step 502). And, the allocation pass/fail judging section 103 compares the minimum width Wc of the column candidate and the maximum width Wn of the article. If the minimum width Wc of the column candidate is larger than or equal to the maximum width Wn of the article, the process goes to step 504. If the minimum width Wc of the column candidate is smaller than the maximum width Wn of the article, the article layout processing section 104 is noticed that the article cannot be allocated to the column candidate (step 507). In step 504, the minimum height Hc of the column candidate and the maximum height Hn of the article are compared. And, if the minimum height Hc of the column candidate is larger than or equal to the maximum height Hn, the process goes to step 505, and if the minimum height Hc of the column candidate is smaller than the maximum height Hn, the article layout processing section 104 is noticed that the article cannot be allocated to the column candidate (step 507).

In step 505, the allocation pass/fail judging section 103 sends the article number of the article to the article output section 152 to obtain the content of the article, actually enters the article into the column candidate according to the article form restriction information such as maximum and minimum values of font, and maximum and minimum values of character spacing and line spacing of the article obtained from the article form limiting information output section 150, and judges whether all article contents could be entered or not. And, if could, the allocation pass/fail judging section 103 notices the article layout processing section 104 that the allocation can be made (step 506), and if could not, it notices that the allocation cannot be made (step 507). The process may be modified so that the maximum width and maximum height of the column candidate are obtained in step 501, they are compared with the maximum width and maximum height in step 503 and step 504, and if the maximum width of the column candidate is equal to or larger than the maximum width of the article and the maximum height of the column candidate is equal to or larger than the maximum height of the article, the process goes to step 506, otherwise the process goes to step 507.

Article Layout Processing Section 104

The article layout processing section 104 searches for a column candidate which complies with the arrangement of each article in the order from the first article in the processing order according to the article processing order C in the group "A, B, C". The column candidate is continuously searched for until all columns are filled with articles or the last article in the processing order is completely processed. The column candidate conforming with the arrangement of each article is searched by obtaining a column candidate group and noticing the article number of the article and the column candidate which is subject to the examination of its conformity to the allocation pass/fail judging section 103. If no appropriate column candidate is found as a result of searching through all column candidates in connection with a certain article, this article is not entered in the applicable layout area. When a column candidate in which a certain article can be entered is found, the article layout processing section 104 stores the column candidate and the group of the article in a mutually associated form as the layout result.

Figure 6:
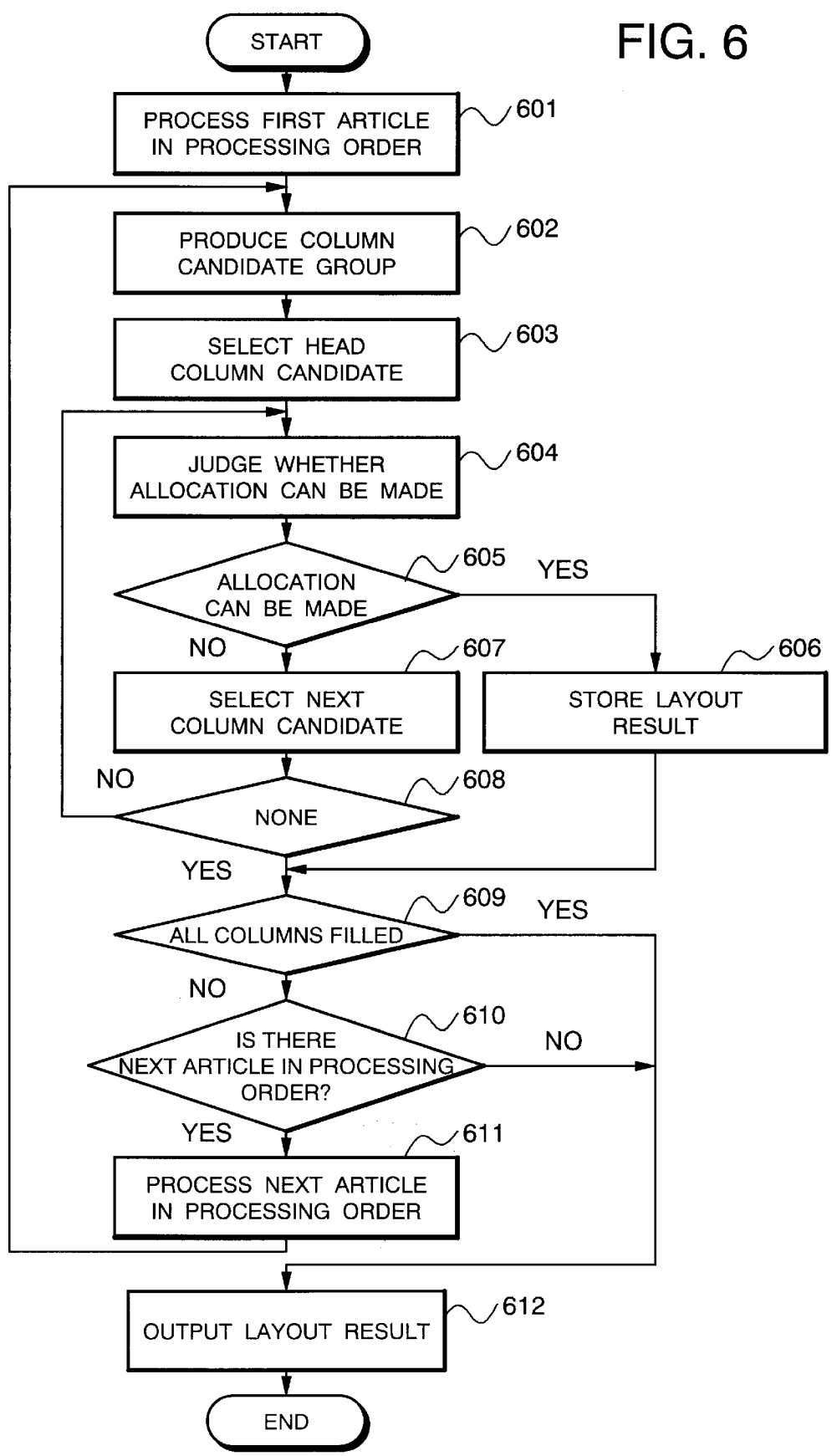
FIG. 6 is a flowchart showing a process by an article layout processing section.

FIG. 6 is a flowchart showing the process of the article layout processing section 104. The article layout processing section 104 first processes the article which is the first in the article processing order (step 601). And, unused-column information (information on the column which is not associated with the article) is outputted to the column candidate group generating section 102 to produce a column candidate group (step 602). When the column candidate group is outputted from the column candidate group generating section 102, the head single column candidate in the group is selected (step 603), the selected column candidate and the article number of the article to be processed are noticed to the allocation pass/fail judging section 103 to judge whether it can be allocated or not (step 604). And, the judged result from the allocation pass/fail judging section 103 is discriminated (step 605), and if allocation can be made, the article number of the article and the column candidate are mutually associated and added to the layout result (step 606). On the other hand, if allocation cannot be made, the next column candidate is selected from the column candidate group (step 607), the process returns to step 604, and the selected column candidate and the article number of the article to be processed are noticed to the allocation pass/fail judging section 103 to cause it to judge whether allocation can be made or not. This process is repeated until it is judged to be possible to allocate by the allocation pass/fail judging section 103 or it is judged to be impossible to allocate up to the last column candidate in the column candidate group. And, when no column candidate is appropriate by checking up to the last column candidate (YES in step 608), the process is terminated without arranging the article to be processed.

Upon completing the process of the head article in the article processing order, the article layout processing section 104 judges whether all columns have been filled with articles or not (step 609), and if all columns are not filled with articles and there is an article of the next processing order in the article processing order (YES in step 610), it is determined to be processed (step 611), the process returns to step 602 to repeat the aforementioned process. When all columns have been filled or the process is completed to the last article in the processing order by repeating the above process, the layout result which has been stored is outputted to the layout result evaluating section 105 and the best layout result retrieval section 109, and the process on the group is completed.

The operation of the layout execute section 100 will be described specifically in detail.

FIG. 7(A) shows a state of columns when the article layout processing section 104 has decided the layout of first and second articles 721, 722 in the article processing order according to the article processing order shown in FIG. 8 with respect to 3×4 columns on a layout area 702 produced by the column generating section 101 according to the column split information. Numerals 1 to 12 assigned to respective columns in FIG. 7(A) indicate the column processing order. Under such circumstances, the third article (article number 5) in the article processing order is processed as follows.

Upon completing the process of the second article 722, the article layout processing section 104 judges whether all columns have been filled in step 609 shown in FIG. 6. In the case of FIG. 7(A), all columns have not been filled, so that with the third article in the article processing order as the subject to be processed (step 611), unused columns are noticed to the column candidate group generating section 102 to produce the column candidate group (step 601).

The column candidate group generating section 102 recognizes that the layout area 702 is divided into 3×4 columns according to the column information outputted from the column generating section 101, and allocates the column processing order to respective columns as shown in FIG. 7(A). When the unused columns are noticed by the article layout processing section 104 and the production of column candidates are commanded, the unused columns are arranged according to the column processing order. In the case of FIG. 7(A), it results in the order of column 3, column 6, column 7, column 8, column 9, column 10, column 11 and column 12. Then, the start columns are determined in this order, and a compound column is produced for every start column. First, with the head column 3 as the start column, the column 3 does not have any unused column which continues rightward or downward, so that it does not have a compound column. Therefore, the column candidate in connection with the column 3 is a sole column 3 only. Then, with the column 6 as the start column, the column 6 has the unused column 3 which continues downward from the column 6, so that a compound column consisting of the columns 6 and 3 is produced. Since the column does not have another compound column, the sole column 6 and the compound column of the column 6 and column 3 become the column candidate. Thus, when the column candidate is determined up to the last start column, the result becomes a column candidate group 701 as shown in FIG. 7(B), and this column candidate group 701 is noticed to the article layout processing section 104.

The article layout processing section 104 searches the noticed column candidate group 701 for a column candidate which can arrange the third article with the article number 5 in the article processing order shown in FIG. 8. First, the head column 3 in the noticed column candidate group 701 is selected as a column candidate (step 603), and sent together with the article number 5 to the allocation pass/fail judging section 103 to make the judgment whether allocation can be made or not (step 604).

The allocation pass/fail judging section 103 determines the minimum width Wc and minimum height Hc of the column 3 which is a column candidate according to the column information outputted from the column generating section 101 (step 501 in FIG. 5), reads the form restriction information on the article with the article number 5 from the article form limiting information output section 150, and determines the maximum width Wn and maximum height Hn of the article (step 502). For example, in the read form restriction information, the article with the article number 5 is assumed to have a width falling in the range of minimum value 711 and maximum value 712 as shown in FIG. 7(C). FIG. 7(C) is scaled to the same level as FIG. 7(A). In such a case, the size of the area occupied by the article with the article number 5 has an area indicated by 714 and 713 in FIG. 7(C), so that the column 3 as the column candidate does not satisfy the form restriction. Therefore, impossibility of allocation is noticed from the allocation pass/fail judging section 103 to the article layout processing section 104 (step 507).

After that, the article layout processing section 104 notices as the column candidates the column 6, a compound column of the column 6 and column 3, the column 7, a compound column of the column 7 and column 10, and a compound column of the column 7, column 10 and column 9 in this order to the allocation pass/fail judging section 103. But, in the case of examples illustrated, a notice of impossibility of allocation is returned. And, when a compound column of the column 7, column 10, column 9 and column 11 is noticed as the next column candidate, the allocation pass/fail judging section 103 checks that this compound column satisfies the width and height restriction of the article with the article number 5 (YES in step 504), reads the contents of the article with the article number 5 from the article output section 152 to actually enter it into the compound column, and finally judges whether allocation can be made or not (step 506). As a result of inserting the article, if it is judged that allocation can be made, it is noticed to the article layout processing section 104. Upon receiving the notice, the article layout processing section 104 stores a group of the article number 5 and the compound column of the column 7, column 10, column 9 and column 11 as a part of the layout result. And, it stores that corresponding with the article by marking the columns 7, 10, 9 and 11 has completed or they are not an unused column.

After completing the process on the article of the article number 5 as described above, because the column 6, column 3, column 12 and column 8 have not been filled and the unprocessed article numbers are remaining at this time, the article layout processing section 104 selects the article with the article number 1 which is to be processed next in step 611 in FIG. 6, returns to step 602, and repeats the process from the point that the column candidate group is produced.

Article Entry Priority Output Section 151

The article entry priority output section 151 comprises a program-controlled CPU and a memory, in response to the request by the layout result evaluating section 105, reads an entry priority for each article to be entered or information on a relative weight concerning whether it shall be entered or not from a given database, and outputs to the layout result evaluating section 105. Generally, the entry priority is determined to have a larger numerical value as the significance of entry is higher. Therefore, as the evaluation value is higher, more articles with higher significance have been entered.

Layout Result Evaluating Section 105

The layout result evaluating section 105 comprises a program-controlled CPU and a memory, receives the layout result outputted from the article layout processing section 104, reads the entry priority of each article from the article entry priority output section 151, calculates the evaluation value which numerically indicates a level of good or bad of the layout result, and outputs to the best layout result retrieval section 109. And, considering that the production of a large empty area in the layout area on paper deteriorates appearance and causes lots of waste on paper, the evaluation value can be adjusted according to a ratio of an empty area occupying the layout area.

Figure 9:
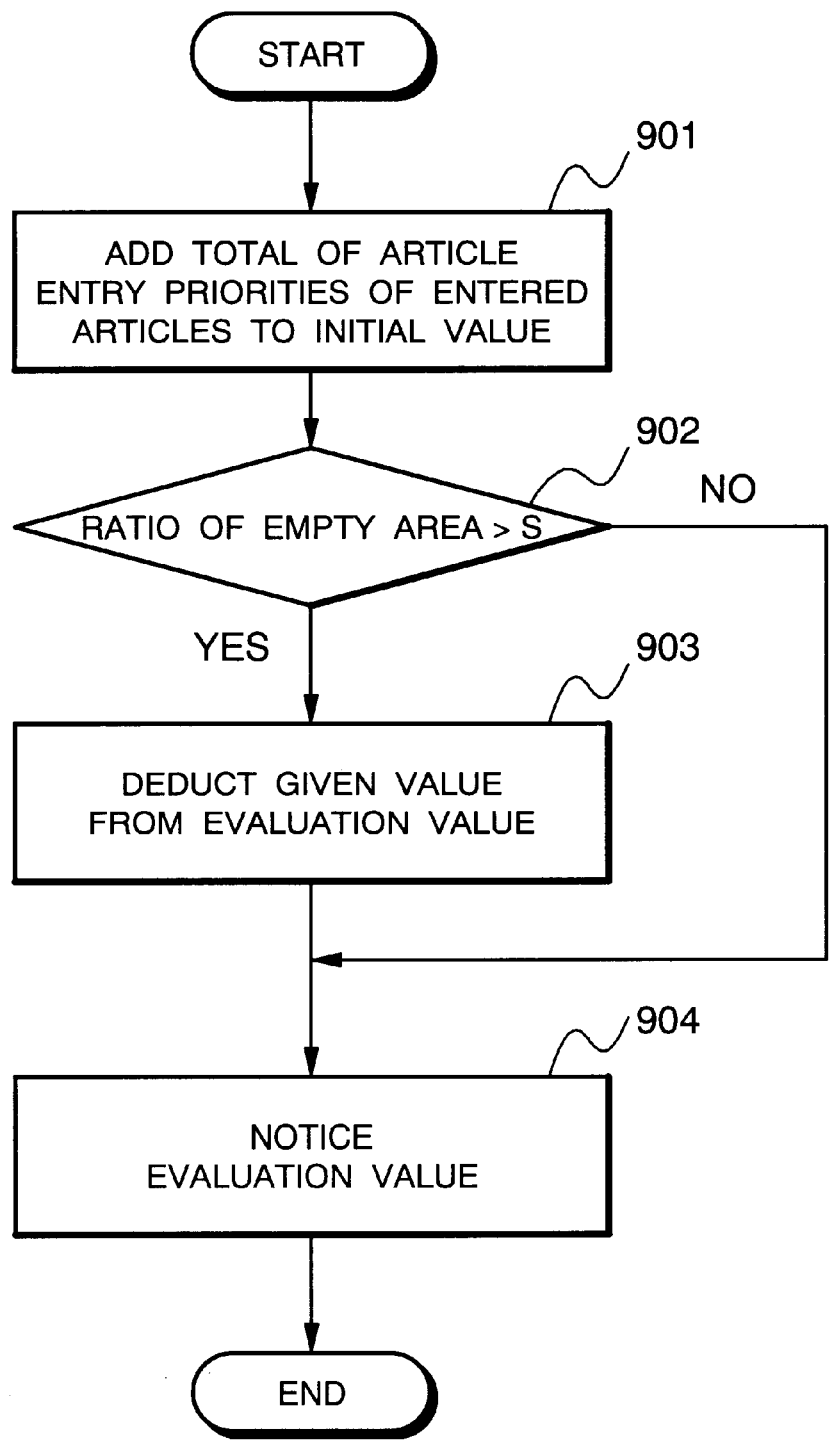
FIG. 9 is a flowchart showing the process by a layout result evaluating section.
Figure 10:
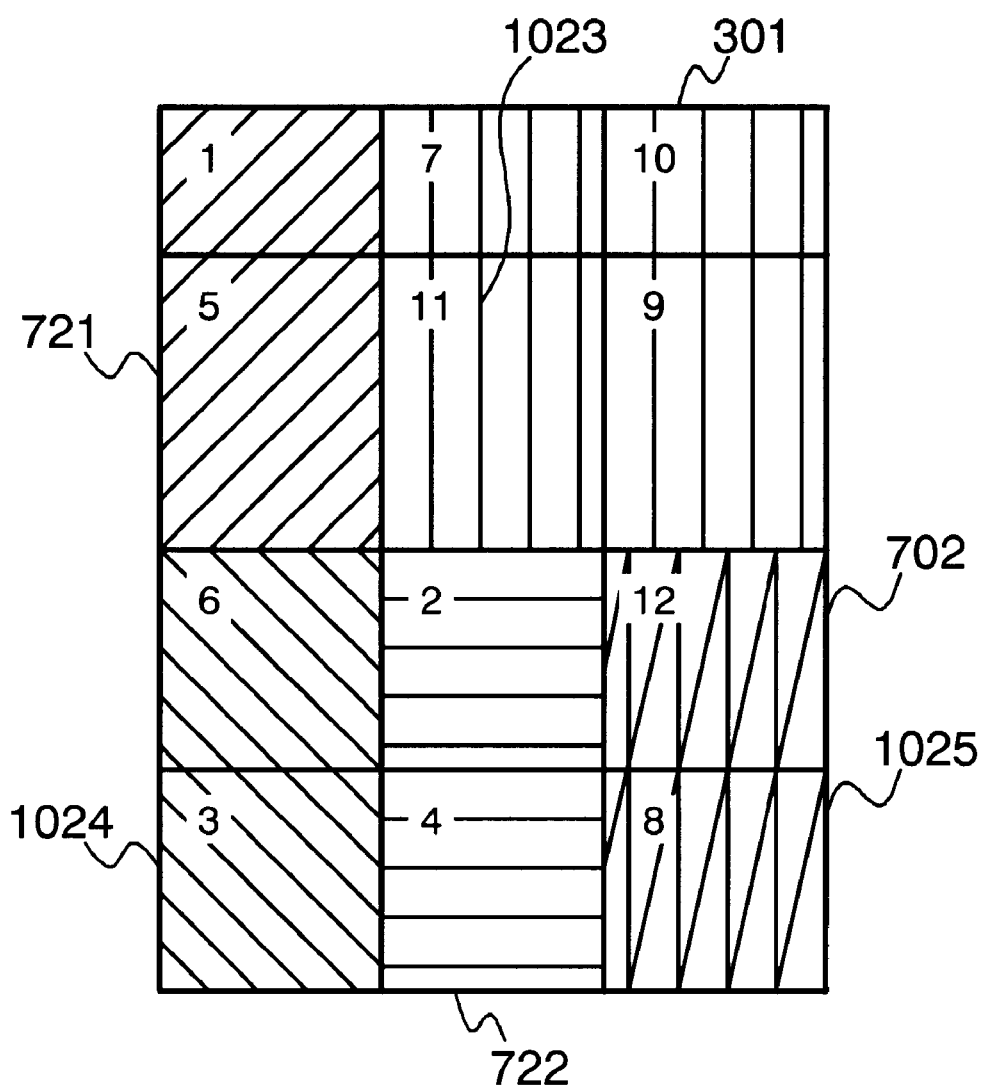
FIG. 10 is a diagram showing a state that articles have been allocated to respective columns.
Figure 12A:
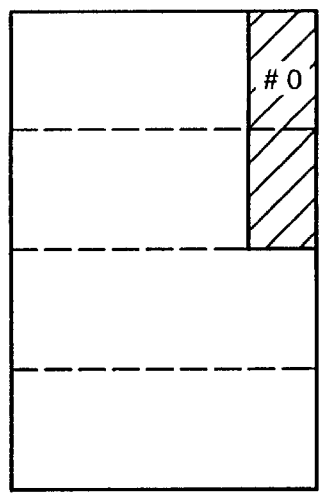
FIG. 12(A) is an explanatory view of the first prior art, indicating a state that an article has been arranged in one area.
Figure 12B:
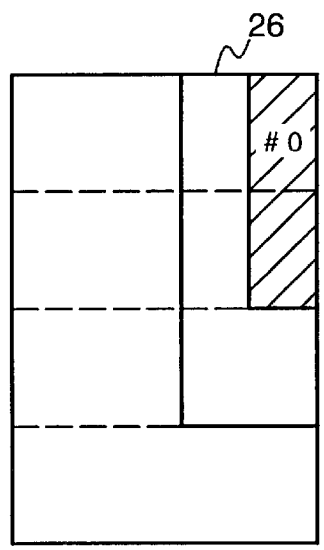
FIG. 12(B) is an explanatory view of the first prior art, indicating a size required for the arrangement of an article to be processed next.
Figure 12C:
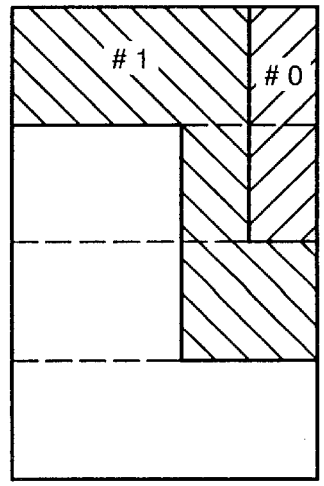
FIG. 12(C) is an explanatory view of the first prior art, indicating a state that an article processed in FIG. 12(B) above has been arranged.
Figure 13A:
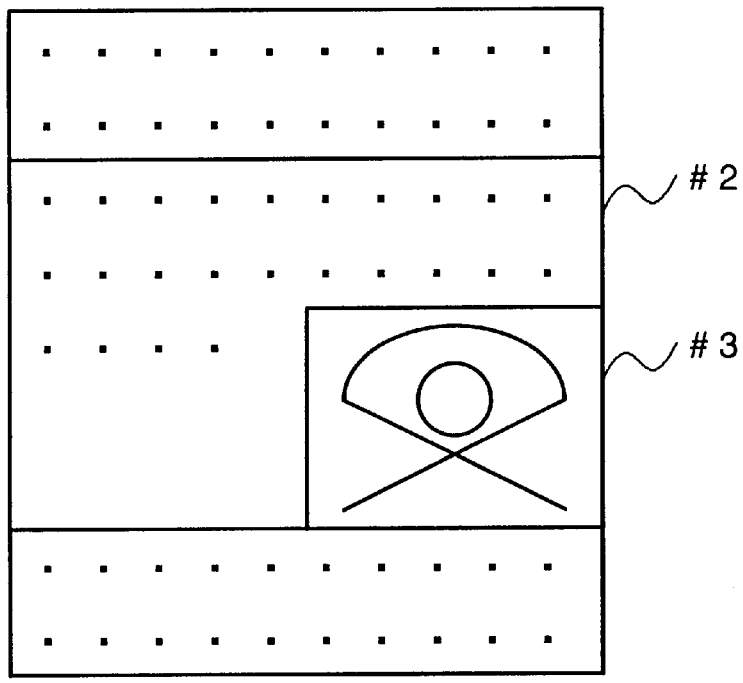
FIG. 13(A) is an explanatory view of the second prior art, indicating a state that an article has been arranged in a previously determined area border.
Figure 13B:
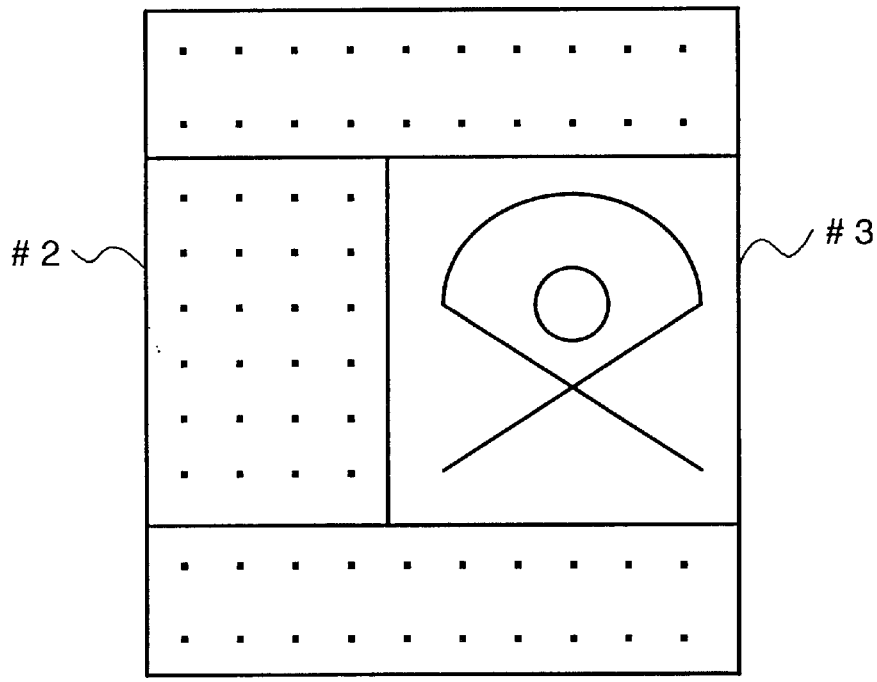
FIG. 13(B) is an explanatory view of the second prior art, indicating a state that an allocation rate of the area border has been adjusted.

FIG. 9 shows an example of the process by the layout result evaluating section 105. Upon receiving the layout result from the article layout processing section 104, the layout result evaluating section 105 reads the entry priority of the article which can be arranged as the layout result from the article entry priority output section 151 to sum up, and adds the total value to the initial value of the evaluation value (step 901). For example, as a result of the article layout process described with reference to FIG. 7, it is assumed that the layout result as shown in FIG. 10 is finally attained. Specifically, it is assumed that an article 721 with the article number 3 is placed on the columns 1, 5, an article 722 with the article number 9 is placed on the columns 2, 4, an article 1023 with the article number 5 is placed on the columns 7, 9, 10 and 11, an article 1024 with the article number 1 is placed on the columns 6, 3, and an article 1025 with the article number 4 is placed on the columns 12, 8. The article with the article number 8 which has an earlier processing order than the article number 4 in FIG. 8 is not arranged because it is judged by the allocation pass/fail judging section 103 that allocation cannot be made because the article with the article number 8 contains a form restriction requiring the full width of the layout area. And, it is assumed that the values shown as the entry priority of the article with each article number in FIG. 11 is outputted from the article entry priority output section 151. In this case, a total "41" of the entry priorities "5", "8", "16", "10" and "2" of the respective articles with the article numbers 3, 9, 5, 1 and 4 is added to the initial value of the evaluation value with respect to the layout result of FIG. 10.

Instead of determining the total of the entry priorities of the articles which can be arranged, a total of squares of respective priority values or products of respective priority values may be used, and a calculating method may be previously determined according to conditions such as a level of priority in determining the layout of articles and a range attainable by the entry priority. And, the initial value of the evaluation value may generally be zero, but in preparation for subtraction based on an empty area to be described afterward, a positive initial value may be entered, so that the final evaluation value can be kept in a positive number.

Then, the layout result evaluating section 105 calculates the size of areas (i.e., empty area) not used for the layout of articles in the layout area. And, based on the calculated result, a ratio of the empty areas in the whole layout area is calculated and compared with a threshold value S previously determined (step 902). If a ratio of empty areas exceeds the threshold value S, the previously determined value is subtracted from the evaluation value determined in step 901 (step 903). And, the evaluation value undergone the subtraction is outputted to the best layout result retrieval section 109 (step 904). On the other hand, if the ratio of empty areas does not exceed the threshold value S, the evaluation value determined in step 901 is outputted as it is to the best layout result retrieval section 109.

The calculation of the empty area can be made by summing the empty areas of all columns assuming that the columns having the articles arranged do not have an empty area and the columns without the arrangement of articles are totally with an empty area. And, since the allocation pass/fail Judging section 103 actually enters the articles to judge whether arrangement can be made or not, the column candidate which has been judged to be arrangeable may also be determined for the size of the empty area when the above judgment is made, so that the size of the empty area is calculated in further detail by the layout result evaluating section 105 with reference to the determined size.

And, as to the subtraction of the evaluation value based on the empty area, a two-way adjusting method which selects whether the given value shall be decreased or not by comparing with the previously determined threshold value S is not used, but the subtraction volume may be designed to be increased as the ratio of the empty area increases, and the subtraction volume may be changed according to the ratio of the empty area.

Best Layout Result Retrieval section 109

The best layout result retrieval section 109 comprises a program-controlled CPU and a memory, and among a plurality of layout results determined by the article layout processing section 104, the layout result that the evaluation value given by the layout result evaluating section 105 is the best is selected, and outputted to the print control section 153. As one example of the specific operation, when the layout result of the first group is outputted from the article layout processing section 104 and its evaluation value is outputted from the layout result evaluating section 105, the best layout result retrieval section 109 pairs them as a group and stores as the best layout result. Then, whenever the layout result is outputted from the article layout processing section 104 and its evaluation value from the layout result evaluating section 105, the outputted evaluation value is compared with the evaluation value of the best layout result, and if the outputted evaluation value is larger, a process is conducted to replace the best layout result by a group of the outputted evaluation value and the layout result corresponding to the outputted evaluation value and store it. Upon completing the process on all groups, the layout result in the best layout result stored at this time is outputted to the print control section 153.

Print Control Section 153

The print control section 153 comprises a program-controlled CPU and a memory, receives the layout result from the best layout result retrieval section 109 and the contents of respective articles from the article output section 152, and controls the printer according to the layout result to print the respective articles on paper. In the same way, indication for checking the print may be shown on the screen of a display. By providing the print control section 153, the process to the printing on paper as the result of process can be automated.

Article Output Section 152

The article output section 152 comprises a program-controlled CPU and a memory, and in response to the request from the allocation pass/fail judging section 103 of the layout execute section 100 and the print control section 153, reads the contents of respective articles to be entered from database, and outputs to the allocation pass/fail judging section 103 and the print control section 153. The contents of the article comprises document component data such as head, body of story, diagram and image which constitute the article. Generally, the article output section 152 has the contents of articles associated with the article numbers and stored in a storage device such as magnetic disc, RAM or the like. And, it may be configured to output articles which are obtained through personal computer communications or textual broadcasting by means of a communications device.

The embodiment of the invention has been described above, but the invention is not limited to the above embodiment, and various additional modifications can be made. For example, the above embodiment employs the column processing order to restrict the number of compound columns which are in the search range, but all possible compound columns may be searched. In such a case, as to each of a plurality of groups which include two pieces of information of the processing order of the articles to be entered and the structure of columns to be virtually determined in the areas in which documents are arranged with the column processing order omitted, and which have at least one piece of information different from other groups, a compound column consisting of an unused sole column conforming to the layout of each article or a plurality of neighboring unused columns is searched in the order from the first article in the processing order until all columns are filled with articles or the last article in the processing order is completely processed.

On the other hand, as shown in the above embodiment, the layout result in the structure restricting the search range as the compound column may differ depending on the column processing order to be used in producing the compound column group. Specifically, even when the column structure is the same or the article processing order is the same, the final layout result of the article is different if the compound column group is different because of a different column processing order. Therefore, it has been attempted in the embodiment to arrange articles on each of a plural pieces of information which include three pieces of information of column split information, column processing order and article processing order, and which have at least one piece of information different from other groups. But, as described above, when the column processing order is not taken into consideration, it is sufficient by arranging articles on each of groups of a plural pieces of information which include two pieces of information of the column split information and the article processing order are contained, and which have at least one piece of information different from other groups.

And, the invention can be applied to not only a case that the layout area is present on one sheet of paper, but also a case that the article is put on each layout area of a plural sheets of paper. In such a case, the layout process of the article on the layout area of a single sheet of paper is made in the same way as in the above embodiment, and when all columns on the layout area are filled with articles, the articles which could be arranged are deleted from the article processing order. And, as to the remaining article processing order, the process may be repeated to effect the same process as the above embodiment to make a layout on the layout area on the next paper. When it is allowed that a single article extends from the bottom column on paper to the top column on the next paper, it may be assumed that the layout areas on all paper are vertically connected to form a single layout area, and the same method as in the above embodiment is applied to this single layout area.

As described above, the following effects can be attained by the present invention.

The research for an area on which an article can be arranged is attempted on not only a sole rectangular column, but also a compound column which is automatically produced by connecting neighboring multiple columns. Since the compound column is formed by connecting a plurality of sole columns in the rectangular form and can have a complex form, the multiple-column document containing a plurality of articles can be arranged without manpower.

And, in order to automatically produce a compound column which can be of a complex form, articles can be combined in a complex form and paper is effectively used.

Besides, each of a plurality of groups which contain two types of information on the column structure and article processing order and have at least one piece of information different from other groups, or each of a plurality of groups which contain three pieces of information on column structure, article processing order and column processing order and have at least one piece of information different from other groups is subjected to the layout processing, the layout result with the highest evaluation value is selected among the layout results, so that a layout which allows to enter more articles with high importance within the limited layout area can be attained. Therefore, a situation that the articles with high entry priority cannot be entered because the articles with low entry priority are entered can be prevented.

And, a situation that many articles with a less form limitation with similar entry priority are not entered because of articles which have a highly limited form to occupy a large area and high entry priority can be prevented.

In the structure to restrict the compound column group to be a candidate by using the column processing order, the number of compound columns to be searched can be limited, and the processing volume can be reduced.

In the structure including column split information producing means, column processing order producing means, article processing order producing means and group producing means, a plurality of groups containing three pieces of information on column structure, article processing order and column processing order can be produced automatically.

Besides, in the structure which gives the evaluation value taking the empty area into consideration in addition to the article entry priority, the layout having the article's entry priority and the empty area judged together can be made, and the layout with a less empty area can be obtained while entering more articles with high significance within the limited layout area.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An article layout device for automatically making a layout of articles onto a multi-column document comprising:

layout means for generating multiple layout candidates for said articles, each layout candidate being generated by continually searching for an unused sole column or compound column from a column group list and arranging said articles sequentially onto said unused sole column or unused compound column until all columns from the column group list have been used or all of said articles having a size that will fit within said unused sole column or unused compound column have been arranged;

article priority output means for outputting a priority of each of said articles;

layout result evaluation means for giving an evaluation value to each layout candidate based on the entry priorities of the articles that have been arranged on said each layout candidate; and best layout result retrieval means for selecting a layout candidate having the best evaluation value as the layout for said articles.

2. An article layout device as set forth in claim 1, wherein said layout means generates each layout candidate in accordance with a column structure and an article processing order, at least one of the column structure and the article processing order being different for each layout candidate.

3. An article layout device as set forth in claim 1, further comprising:

article form restriction information output means for outputting form restriction information on each article, wherein said layout means generates each layout candidate in accordance with a column structure and an article processing order, at least one of the column structure and the article processing order being different for each layout candidate, and arranges an article onto the unused sole column or unused compound column only if the unused column or compound column meets the form restriction information on said article and it is judged that said article can be arranged in the unused column or compound column, in accordance with the article processing order from the first article in the article processing order until all of the columns from the column group list have been used or the last article in the article processing order has been processed.

4. An article layout device as set forth in claim 1, wherein said layout means arranges the articles sequentially onto the unused sole column or unused compound column in accordance with an article processing order from the first article in the article processing order until all of the columns from the column group list have been used or the last article in the article processing order has been processed, and wherein said layout means searches for the unused sole column or unused compound column from the column group list, wherein the column group list that has been determined in accordance with a column processing order.

5. An article layout device as set forth in claim 1, wherein said layout means searches for the unused sole column or unused compound column from the column group list that has been determined in accordance with a column processing order and arranges the articles sequentially onto the unused sole column or unused compound column in accordance with an article processing order from the first article in the article processing order until all of the columns from the column group list have been used or the last article in the article processing order has been processed.

6. An article layout device as set forth in claim 1, further comprising:

article form restriction information output means for outputting form restriction information on each article, wherein said layout means generates each layout candidate in accordance with a column structure, an article processing order, and a column processing order, at least one of the column structure, the article processing order, and the column processing order being different for each layout candidate, and arranges an article onto the unused sole column or unused compound column only if the unused column or compound column meets the form restriction information on said article and it is judged that said article can be arranged in the unused sole column or unused compound column, in accordance with the article processing order from the first article in the article processing order until all of the columns from the column group list have been used or the last article in the article processing order has been processed.

7. An article layout device as set forth in claim 1, further comprising:

article form restriction information output means for outputting form restriction information on each article, wherein said layout means comprises:

column production means for generating a plurality of columns in accordance with a column structure, column candidate group generating means for producing the column group list from the plurality of columns in accordance with a column processing order, allocation judging means for judging whether an article can be arranged onto the unused sole column or unused compound column from the column group list with reference to said article form restriction information, and article layout processing means for searching for the unused sole column or unused compound column and arranging said articles sequentially in accordance with the article processing order from the first article in the article processing order until all of the columns from the column group list have been used or the last article in the article processing order has been processed.

8. An article layout device as set forth in claim 7, further comprising:

column split information generating means for producing the column structure;

column processing order generating means for producing the column processing order; and article processing order generating means for producing the article processing order.

9. An article layout device as set forth in claim 1, wherein said layout result evaluation means calculates for each layout candidate a ratio of empty areas on the layout area with respect to the whole layout area, and if said ratio exceeds a threshold value, decreases the evaluation value.

10. An article layout device as set forth in claim 1, wherein said layout result evaluation means calculates for each layout candidate a ratio of empty areas on the layout area with respect to the whole layout area, and decreases the evaluation value by a value corresponding to said ratio.

11. An article layout device for automatically making a layout of articles onto a multi-column document comprising:

column split information generating means for producing a column structure;

column processing order generating means for producing a column processing order;

article processing order generating means for producing an article processing order;

layout means for generating multiple layout candidates for said articles in accordance with the column structure, the article processing order, and the column processing order, at least one of the column structure, the article processing order, and the column processing order being different from for each layout candidate;

article priority output means for outputting a priority of each of said articles;

layout result evaluation means for giving the evaluation value to each layout candidate based on the entry priorities of the articles that have been arranged on said each layout candidate; and best layout result retrieval means for selecting a layout candidate having the best evaluation value as the layout for said articles.

12. An article layout device as set forth in claim 11, further comprising:

article form restriction information output means for outputting form restriction information on each article;

wherein said layout means generates each layout candidate by searching for an unused sole column or unused compound column from a column group list that has been determined in accordance with the column structure and the column processing order and arranges said articles sequentially onto said sole column or compound column in accordance with the article processing order if it is judged that said article can be arranged in said column.

13. An article layout device as set forth in claim 11, further comprising:

article form restriction information output means for outputting form restriction information on each article;

wherein said layout means comprises column production means for generating a plurality of columns in accordance with the column structure;

column candidate group generating means for producing the column group list from the plurality of columns in accordance with the column processing order;

allocation judging means for judging whether an article can be arranged onto the unused sole column or unused compound column from the column group list with reference to said article form restriction information; and article layout processing means for searching for the unused sole column or unused compound column and arranging said articles sequentially in accordance with the article processing order from the first article in the article processing order all of the columns from the column group list have been used or the last article in the article processing order has been processed.

14. A method of automatically laying out a plurality of articles on a multicolumn document area, said method comprising the steps of:

(a) assigning a priority to each of said articles;

(b) dividing the document area into a plurality of columns in accordance with a column structure;

(c) producing a column group list using the plurality of columns in accordance with a column processing order, wherein each entry in the column group list is either a sole column or a compound column;

(d) generating a layout candidate by arranging said articles sequentially onto an unused sole column or unused compound column from the column group list in accordance with an article processing order until all of said articles having a size that will fit within the unused sole column or unused compound column have been arranged;

(e) generating at least one more layout candidate by repeating at least one of steps (b), (c), and (d) using a different column structure, a different column processing order, or a different article processing order;

(f) evaluating each layout candidate based on the priority of the articles that were arranged on said document area to produce an evaluation result for the layout candidate; and (g) selecting a best layout based on the evaluation results of the layout candidates.

15. A method as set forth in claim 14, wherein the step of evaluating includes the step of adjusting the evaluation result according to an amount of empty area present in the layout candidate.

16. A method as set forth in claim 14, further comprising the steps of inputting form restrictions for each article, wherein said articles are arranged sequentially onto the unused sole column or unused compound column subject to the form restrictions.

17. A method as set forth in claim 14, wherein the step of generating the layout candidates includes the step of judging, for each article to be arranged, whether a particular unused column or unused compound column is appropriate for that article, and if not, selecting another unused column or unused compound column from the column group list.

18. A method as set forth in claim 14, wherein the different column structure, the different column processing order, or the different article processing order is determined randomly.

19. A method as set forth in claim 14, wherein the step (c) of producing the column group list includes the steps of selecting as a first entry of the column group list, a sole column which is first in the column processing order, as a second entry of the column group list, a compound column including the sole column and one another column that is to the right or to the bottom of the sole column, and if there is no column that is to the right or to the bottom of the column that is first in the column processing order, selecting as the second entry of the column group list, a sole column which is second in the column processing order.

20. A method as set forth in claim 19, wherein the compound column of the column group list becomes used when any one column in the compound column becomes used.

\* \* \* \* \*